United States Patent
Xiao

(10) Patent No.: US 12,439,688 B2
(45) Date of Patent: Oct. 7, 2025

(54) ARRAY SUBSTRATE AND DISPLAY PANEL

(71) Applicant: TCL CHINA STAR OPTOELECTRONICS TECHNOLOGY CO., LTD., Shenzhen (CN)

(72) Inventor: Bangqing Xiao, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 594 days.

(21) Appl. No.: 17/286,479

(22) PCT Filed: Feb. 22, 2021

(86) PCT No.: PCT/CN2021/077286
§ 371 (c)(1),
(2) Date: Apr. 18, 2021

(87) PCT Pub. No.: WO2022/160392
PCT Pub. Date: Aug. 4, 2022

(65) Prior Publication Data
US 2023/0261006 A1    Aug. 17, 2023

(30) Foreign Application Priority Data

Jan. 28, 2021 (CN) .......................... 202110116613.1

(51) Int. Cl.
*G02F 1/1333* (2006.01)
*G02F 1/1343* (2006.01)
(Continued)

(52) U.S. Cl.
CPC ....... *H10D 86/60* (2025.01); *G02F 1/134309* (2013.01); *G02F 1/136286* (2013.01); *H10D 86/441* (2025.01)

(58) Field of Classification Search
CPC ......... G02F 1/136227; G02F 2201/121; G02F 2201/123; G02F 1/136286;
(Continued)

(56) References Cited

U.S. PATENT DOCUMENTS 10,014,330 B2 *  7/2018  Xu ......................... H01L 27/124
10,209,574 B2 *  2/2019  Lee .................... G02F 1/134336
(Continued)

FOREIGN PATENT DOCUMENTS

CN  101699339 A  4/2010
CN  106356381 A  1/2017
(Continued)

OTHER PUBLICATIONS

International Search Report in International application No. PCT/CN2021/077286, mailed on Nov. 2, 2021.
(Continued)

*Primary Examiner* — Ajay Ojha
*Assistant Examiner* — Tsz K Chiu
(74) *Attorney, Agent, or Firm* — PV IP PC; Wei Te Chung

(57) ABSTRACT

The present application provides an array substrate and a display panel. The present application changes a configuration of a data line positioned between one of display pixel units and one of dummy pixel units to reduce a charging rate of the display pixel units corresponding to the data lines and ensure that the charging rate is equal to a charging rate of other pixel units, thereby relieving poor display effects at edges of the display panel.

14 Claims, 6 Drawing Sheets

(51) Int. Cl.
*G02F 1/1345* (2006.01)
*G02F 1/1362* (2006.01)
*H10D 86/40* (2025.01)
*H10D 86/60* (2025.01)

(58) Field of Classification Search
CPC ......... G02F 1/136213; G02F 1/136204; G02F 1/136209; G02F 1/133388; G02F 1/1362; G02F 1/134336; G02F 1/134363; G02F 1/13456; G02F 1/136218; G02F 2201/40; G02F 1/1309; G02F 1/133512; G02F 1/1343; G02F 1/1345; G02F 1/13452; G02F 1/13454; G02F 1/13458; G02F 1/13606; G02F 1/136254; G02F 1/136277; G02F 1/13629; G02F 1/1368; G02F 1/167; G02F 2201/48; G02F 1/1333; G02F 1/133351; G02F 1/1337; G02F 1/1339; G02F 1/13392; G02F 1/13394; G02F 1/1675; G02F 1/1685; G02F 2201/56; H01L 27/142; H01L 27/124; H01L 27/1288
See application file for complete search history.

(56) References Cited

U.S. PATENT DOCUMENTS

| | | | | |
|---|---|---|---|---|
| 12,189,250 B2* | 1/2025 | Zhang | ............... | G02F 1/136286 |
| 2004/0016931 A1* | 1/2004 | Yamasaki | ............ | H10K 59/126 |
| | | | | 257/79 |
| 2005/0078240 A1* | 4/2005 | Murade | ............. | G02F 1/136209 |
| | | | | 349/110 |
| 2008/0012808 A1* | 1/2008 | Kurahashi | ......... | G02F 1/134363 |
| | | | | 345/87 |
| 2010/0066711 A1* | 3/2010 | Maeda | ................. | G09G 3/3648 |
| | | | | 345/206 |
| 2011/0216260 A1* | 9/2011 | Park | ........................ | G02F 1/136 |
| | | | | 349/41 |
| 2012/0099067 A1 | 4/2012 | Hara | | |
| 2012/0249920 A1* | 10/2012 | Hara | ..................... | G09G 3/002 |
| | | | | 349/151 |
| 2012/0307176 A1* | 12/2012 | Tanaka | ................ | G09G 3/3648 |
| | | | | 349/139 |
| 2013/0120671 A1 | 5/2013 | Shirasaka | | |
| 2014/0292626 A1* | 10/2014 | Park | ...................... | G09G 3/3611 |
| | | | | 345/87 |
| 2015/0146123 A1* | 5/2015 | Jung | ................. | G02F 1/136286 |
| | | | | 349/42 |
| 2016/0246136 A1* | 8/2016 | Lim | .................. | G02F 1/134336 |
| 2016/0320646 A1* | 11/2016 | Lee | ................... | G02F 1/134336 |
| 2017/0011693 A1* | 1/2017 | Park | .................. | G09G 3/3614 |
| 2017/0123285 A1* | 5/2017 | Suzuki | ............. | G02F 1/133345 |
| 2017/0329193 A1* | 11/2017 | Wu | ................. | G02F 1/136286 |
| 2017/0338252 A1* | 11/2017 | Lee | ................... | H10K 59/1213 |
| 2018/0026057 A1* | 1/2018 | Zhang | ................ | H01L 27/1288 |
| | | | | 257/72 |
| 2018/0059473 A1 | 3/2018 | Uchida | | |
| 2018/0188616 A1 | 7/2018 | Jeong | | |
| 2019/0115415 A1* | 4/2019 | Choi | ................... | H10K 50/805 |
| 2022/0326558 A1* | 10/2022 | Long | ................. | G02F 1/136286 |

FOREIGN PATENT DOCUMENTS

| | | |
|---|---|---|
| CN | 109426041 A | 3/2019 |
| CN | 209946604 U | 1/2020 |
| CN | 210573114 U | 5/2020 |
| CN | 111474789 A | 7/2020 |
| JP | H07333654 A | 12/1995 |
| JP | 2008026348 A | 2/2008 |
| KR | 20080089747 A | 10/2008 |
| KR | 20160083346 A | 7/2016 |
| TW | 200914925 A | 4/2009 |

OTHER PUBLICATIONS

Written Opinion of the International Search Authority in International application No. PCT/CN2021/077286, mailed on Nov. 2, 2021.

Chinese Office Action issued in corresponding Chinese Patent Application No. 202110116613.1 dated Aug. 26, 2021, pp. 1-6.

* cited by examiner

ARRAY SUBSTRATE AND DISPLAY PANEL

RELATED APPLICATIONS

This application is a Notional Phase of PCT Patent Application No. PCT/CN2021/077286 having international filing date of Feb. 22, 2021, which claims the benefit of priority of Chinese Patent Application No. 202110116613.1 filed on Jan. 28, 2021. The contents of the above applications are all incorporated by reference as if fully set forth herein in their entirety.

FIELD OF INVENTION

The present application is related to the field of display technology and specifically to an array substrate and a display panel.

BACKGROUND OF INVENTION

In flat panel display devices, due to characteristics of small sizes, low radiation, and relatively low manufacturing costs, thin-film transistor liquid crystal display (TFT-LCD) panels have been widely used in electronic products such as mobile phones, computers, and televisions.

In order to ensure etching uniformity of display pixels positioned at edges of a display region during LCD manufacturing processes, several rows or columns of dummy pixels are usually disposed at the edges of the display region of an array substrate, so that the edges of the display region have dummy thin-film transistors and dummy pixel electrodes.

At the edges of a display panel, the display pixels and the dummy pixels share a data line for charging. However, in order to ensure that the dummy pixels do not display, the data line connected to the dummy pixels is usually disconnected. In this case, the data line originally shared to charge the display pixels and the dummy pixels becomes only configured to charge corresponding display pixels. As a result, a load of the data line becomes smaller, and a charging rate of the display pixels at the edges is higher than a charging rate of other pixels, thereby leading to poor display effects at the edges of the display panel, such as bright lines at the edges of the display panel.

SUMMARY OF INVENTION

The present application provides an array substrate and a display panel to reduce a charging rate of display pixel units corresponding to dummy pixel units and ensure that the charging rate is equal to a charging rate of other pixel units, thereby relieving poor display effects at edges of the display panel.

In order to solve the above problems, technical solutions provided by the present application are as follows.

An array substrate includes a display region and a non-display region adjacent to the display region.

The array substrate includes a plurality of scan lines extending along a horizontal direction, a plurality of data lines extending along a vertical direction, and a plurality of pixel units defined by intersections of the scan lines and the data lines.

The pixel units include display pixel units positioned in the display region and dummy pixel units positioned in the non-display region. The display pixel units include display pixel electrodes connected to the data lines. The dummy pixel units include dummy pixel electrodes disconnected from the data lines.

Each of the data lines includes a plurality of first data lines and at least one second data line. The second data line is positioned between one of the display pixel units and one of the dummy pixel units.

A projection of the second data line at least overlaps a portion of one of the dummy pixel electrodes to form an overlapping region.

In the array substrate in the present application, the second data line includes a trunk portion and a branch portion. The trunk portion extends along the vertical direction. The branch portion extends along the horizontal direction.

A projection of the branch portion overlaps an adjacent one of the dummy pixel electrodes to form the overlapping region.

In the array substrate in the present application, the second data line includes a trunk portion and a branch portion. The trunk portion extends along the vertical direction. The branch portion includes at least one first branch portion extending along the horizontal direction and at least one second branch portion extending along the vertical direction. The first branch portion perpendicularly intersects the second branch portion.

A projection of the first branch portion overlaps an adjacent one of the dummy pixel electrodes to form a first overlapping region. A projection of the second branch portion overlaps an adjacent one of the dummy pixel electrodes to form a second overlapping region.

In the array substrate in the present application, a length of the second data line is longer than a length of each of the first data lines.

In the array substrate in the present application, the second data line includes a first portion and a second portion. The first portion is parallel to the first data lines. The second portion is disposed around an opening region of a corresponding one of the dummy pixel units. A projection of the first portion overlaps one of the dummy pixel electrodes to form the overlapping region.

In the array substrate in the present application, a projection of the second portion of the second data line partially overlaps an adjacent one of the dummy pixel electrodes.

In the array substrate in the present application, the second portion of the second data line is a curve.

In the array substrate in the present application, the array substrate further includes a common electrode. The dummy pixel electrodes are electrically connected to the common electrode.

In the array substrate in the present application, the dummy pixel electrodes and the common electrode have a same electric potential.

In the array substrate in the present application, the common electrode is positioned in the non-display region.

The present application provides a display panel including an array substrate. The array substrate includes a display region and a non-display region adjacent to the display region.

The array substrate includes a plurality of scan lines extending along a horizontal direction, a plurality of data lines extending along a vertical direction, and a plurality of pixel units defined by intersections of the scan lines and the data lines.

The pixel units include display pixel units positioned in the display region and dummy pixel units positioned in the non-display region. The display pixel units include display pixel electrodes connected to the data lines. The dummy pixel units include dummy pixel electrodes disconnected from the data lines.

Each of the data lines includes a plurality of first data lines and at least one second data line. The second data line is positioned between one of the display pixel units and one of the dummy pixel units.

A projection of the second data line at least overlaps a portion of one of the dummy pixel electrodes to form an overlapping region.

In the display panel of the present application, the second data line includes a trunk portion and a branch portion. The trunk portion extends along the vertical direction. The branch portion extends along the horizontal direction.

A projection of the branch portion overlaps an adjacent one of the dummy pixel electrodes to form the overlapping region.

In the display panel of the present application, the second data line includes a trunk portion and a branch portion. The trunk portion extends along the vertical direction. The branch portion includes at least one first branch portion extending along the horizontal direction and at least one second branch portion extending along the vertical direction. The first branch portion perpendicularly intersects the second branch portion.

A projection of the first branch portion overlaps an adjacent one of the dummy pixel electrodes to form a first overlapping region. A projection of the second branch portion overlaps an adjacent one of the dummy pixel electrodes to form a second overlapping region.

In the display panel of the present application, a length of the second data line is longer than a length of each of the first data lines.

In the display panel of the present application, the second data line includes a first portion and a second portion. The first portion is parallel to the first data lines. The second portion is disposed around an opening region of a corresponding one of the dummy pixel units. A projection of the first portion overlaps one of the dummy pixel electrodes to form the overlapping region.

In the display panel of the present application, a projection of the second portion of the second data line partially overlaps an adjacent one of the dummy pixel electrodes.

In the display panel of the present application, the second portion of the second data line is a curve.

In the display panel of the present application, the array substrate further includes a common electrode. The dummy pixel electrodes are electrically connected to the common electrode.

In the display panel of the present application, the dummy pixel electrodes and the common electrode have a same electric potential.

In the display panel of the present application, the common electrode is positioned in the non-display region.

The present application changes a configuration of the second data line of the data lines positioned between one of the display pixel units and one of the dummy pixel units, so the projection of the branch portion overlaps an adjacent one of the dummy pixel electrodes to form the overlapping region. In this way, capacitances are formed between the second data line and other film layers of the dummy pixel units, and a capacitive load on the second data line is then increased, so a charging rate of the display pixel units corresponding to the second data line is reduced. Therefore, the charging rate of each of the display pixel units in the array substrate can be guaranteed to be equal, and poor display effects at edges of the display panel having the array substrate can be relieved.

DESCRIPTION OF DRAWINGS

The following describes specific embodiments of the present application in detail with reference to the accompanying drawings, which will make technical solutions and other beneficial effects of the present application obvious.

DETAILED DESCRIPTION OF EMBODIMENTS

The present application provides an array substrate and a display panel. In order to make purposes, technical solutions, and effects of the present application clearer and more specific, the present application is further described in detail below with reference to the accompanying drawings and examples. It should be understood that the specific embodiments described herein are only used to explain the application and are not used to limit the present application.

Figure 1:
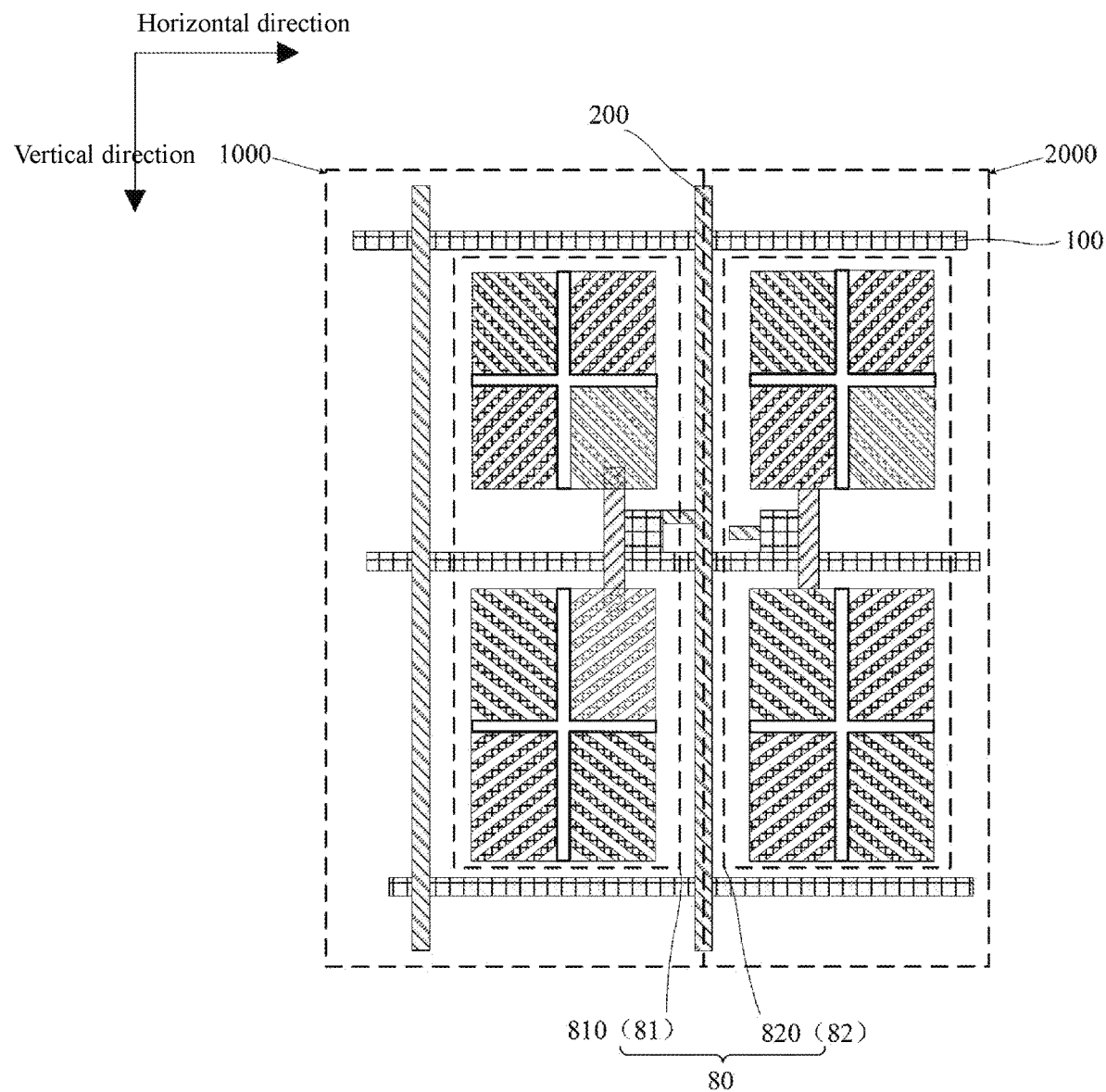
FIG. 1 is a top view of pixel units of an array substrate in prior art.

Please refer to FIG. 1, which is a top view of pixel units of an array substrate in prior art.

In prior art, the array substrate includes a display region 1000 and a non-display region 2000 adjacent to the display region 1000. The array substrate includes a plurality of scan lines 100 extending along a horizontal direction, a plurality of data lines 200 extending along a vertical direction, and a plurality of pixel units 80 defined by intersections of the scan lines 100 and the data lines 200. The pixel units 80 include display pixel units 81 positioned in the display region 1000 and dummy pixel units 82 positioned in the non-display region 2000. The display pixel units 81 include display pixel electrodes 810 connected to the data lines 200. The dummy pixel units 82 include dummy pixel electrodes 820.

However, in order to ensure that the dummy pixel units 82 do not display, the data lines 200 connected to the dummy pixel electrodes 820 are usually in a disconnected state. In this case, one of the data lines 200 originally shared to charge the display pixel units 81 and the dummy pixel units 82 becomes configured to only charge corresponding display pixel units 81. As a result, a load of the data lines 200 becomes smaller, and a charging rate of the display pixel units 81 connected to the data lines 200 is higher than a charging rate of other pixels. When the array substrate is manufactured into a display panel, because the charging rate of the display pixel units 81 at edges of the display panel is higher than the charging rate of other pixels, poor display effects occur at the edges of the display panel. Based on this, the present application provides an array substrate and a display panel to solve the above problems.

An embodiment of the present application provides an array substrate and a display panel. Detailed descriptions are given below. It should be explained that an order of the description in following embodiments is not intended to limit a preferred order of the embodiments.

Figure 2:
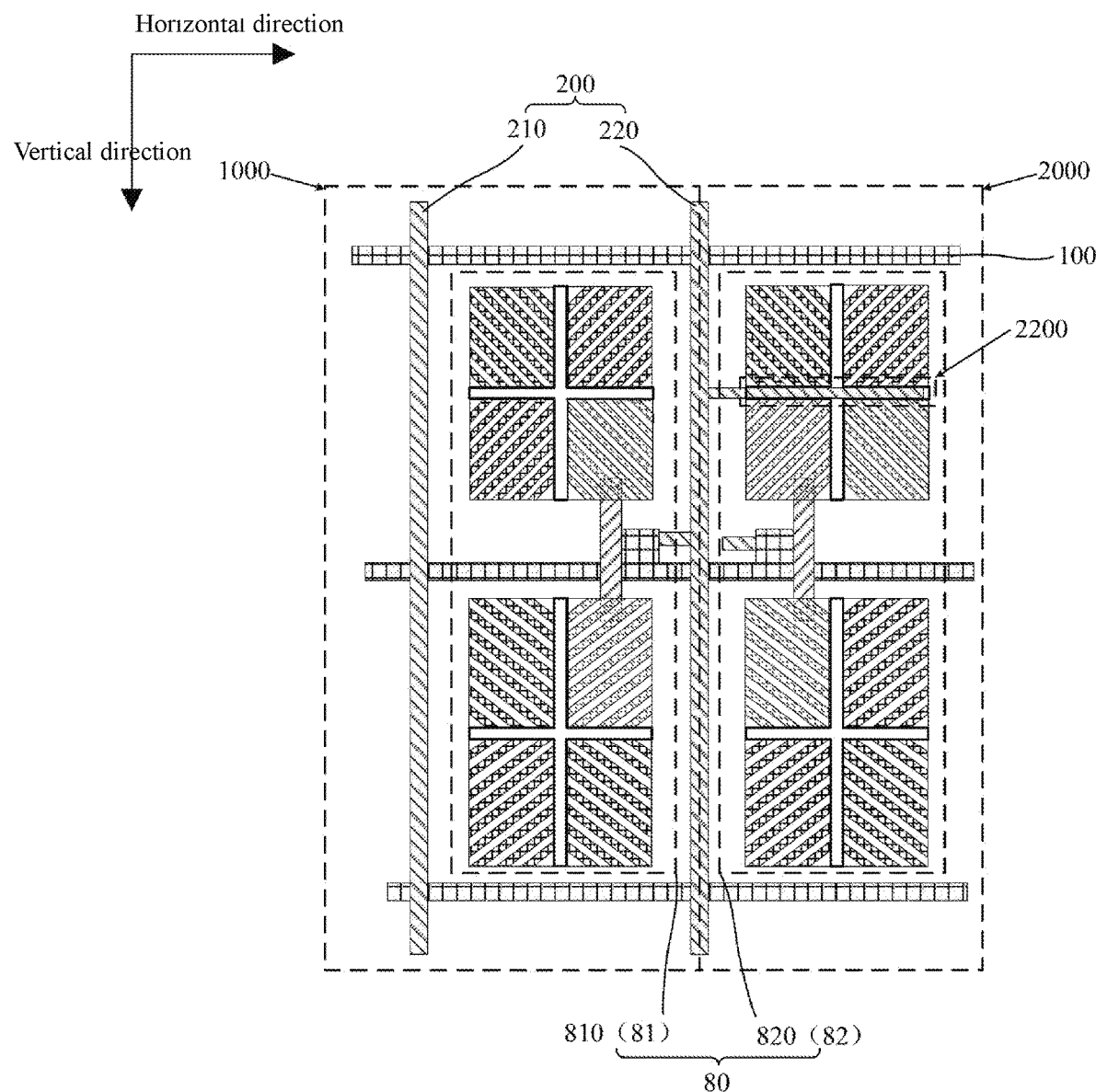
FIG. 2 is a top view of pixel units of an array substrate provided by an embodiment of the present application.

Please refer to FIG. 2, which is a top view of pixel units of an array substrate provided by an embodiment of the present application.

The present application provides an array substrate. The array substrate includes a display region 1000 and a non-display region 2000 adjacent to the display region 1000. The array substrate includes a plurality of scan lines 100 extending along a horizontal direction, a plurality of data lines 200 extending along a vertical direction, and a plurality of pixel units 80 defined by intersections of the scan lines 100 and the data lines 200.

The pixel units 80 include display pixel units 81 positioned in the display region 1000 and dummy pixel units 82 positioned in the non-display region 2000. The display pixel units 81 include display pixel electrodes 810 connected to the data lines 200. The dummy pixel units 82 include dummy pixel electrodes 820 disconnected from the data lines 200.

Each of the data lines 200 includes a plurality of first data lines 210 and at least one second data line 220. The second data line 220 is positioned between one of the display pixel units 81 and one of the dummy pixel units 82.

A projection of the second data line 220 at least overlaps a portion of one of the dummy pixel electrodes 820 to form an overlapping region 2200.

The present application changes a configuration of the second data line 220 of the data lines 200 positioned between one of the display pixel units 81 and one of the dummy pixel units 82, so the projection of second data line 220 at least overlaps the portion of one of the dummy pixel electrodes 820 to form an overlapping region 2200. In this way, capacitances are formed between the second data line 220 and other film layers of the dummy pixel units 82, and a capacitive load on the second data line 220 is then increased, so a charging rate of the display pixel units 81 corresponding to the second data line 220 is reduced. Therefore, the charging rate of each of the display pixel units 81 in the array substrate can be guaranteed to be equal, and poor display effects at the edges of the display panel having the array substrate can be relieved.

Technical solutions of the present application are now described with reference to specific embodiments.

First Embodiment

Figure 3:
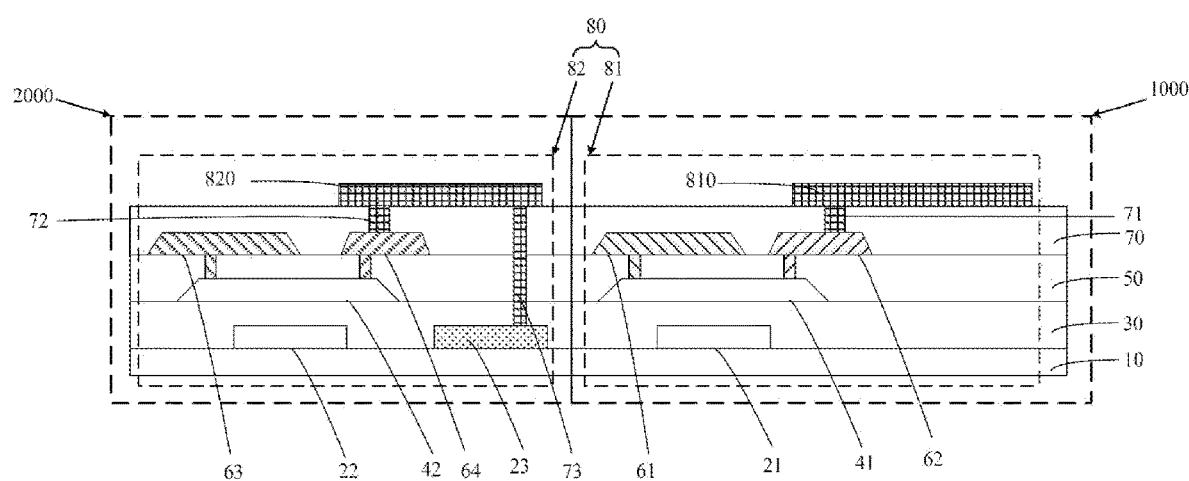
FIG. 3 is a structural schematic diagram of the array substrate provided by an embodiment of the present application.

Please refer to FIG. 3, which is a structural schematic diagram of the array substrate provided by an embodiment of the present application.

This embodiment provides an array substrate. The array substrate includes a display region 1000 and a non-display region 2000 adjacent to the display region 1000. It can be understood that FIG. 3 only shows part of film layer structures of the display region 1000 and the non-display region 2000 for illustrating an embodiment of the present application.

In this embodiment, the array substrate includes a base substrate 10, a gate insulating layer 30, a planarization layer 50, and a passivation layer 70, which are stacked. The array substrate further includes a first gate 21 and a second gate 22 positioned between the base substrate 10 and the gate insulating layer 30, a first active layer 41 and a second active layer 42 positioned between the gate insulating layer 30 and the planarization layer 50, a first source 61 and a first drain 62 positioned above the first active layer 41, a second source 63 and a second drain 64 positioned above the second active layer 42, and a pixel electrode layer positioned above the passivation layer 70.

In this embodiment, a material of the base substrate 10 includes, but is not limited to, polyethylene terephthalate, polyimide, triacetate films, or other flexible materials. Furthermore, in this embodiment, the base substrate 10 is a PI substrate, which is mainly polyimide. A PI material can effectively increase a light transmittance of a substrate.

The gate insulating layer 30 has strong water and oxygen barrier capability and insulation capability, and its material includes, but is not limited to, silicon oxide, silicon nitride, silicon oxynitride, etc., or laminates thereof. Materials of the first active layer 41 and the second active layer 42 include, but are not limited to, indium gallium zinc oxide. Materials of the first gate 21, the second gate 22, the first source 61, the first drain 62, the second source 63, and the second drain 64 include, but are not limited to, metals such as molybdenum, silver, aluminum, etc., or laminates thereof. A material of the passivation layer 70 includes, but is not limited to, silicon oxide, silicon nitride, silicon oxynitride, etc., or laminates thereof.

In this embodiment, the array substrate further includes pixel units 80. The pixel units 80 include display pixel units 81 positioned in the display region 1000 and dummy pixel units 82 positioned in the non-display region 2000. Each of the display pixel units 81 includes the first gate 21, the first active layer 41, the first source 61, the first drain 62, and a display pixel electrode 810 on the passivation layer 70, which are stacked. Each of the dummy pixel units 82 includes the second gate 22, the second active layer 42, the second source 63, the second drain 64, and the passivation layer 70, and a dummy pixel electrode 820 on the passivation layer 70, which are stacked. The display pixel electrode 810 is positioned in the display region 1000, and the dummy pixel electrode 820 is positioned in the non-display region 2000.

In this embodiment, the passivation layer 70 includes a first through-hole 71 and a second through-hole 72. The first through-hole 71 penetrates the passivation layer 70 and is positioned directly above the first drain 62. The second through-hole 72 penetrates the passivation layer 70 and is positioned directly above the second drain 64. The display pixel electrode 810 is electrically connected to the first drain 62 through the first through-hole 71. The dummy pixel electrode 820 is electrically connected to the second drain 64 through the second through-hole 72.

Figure 4:
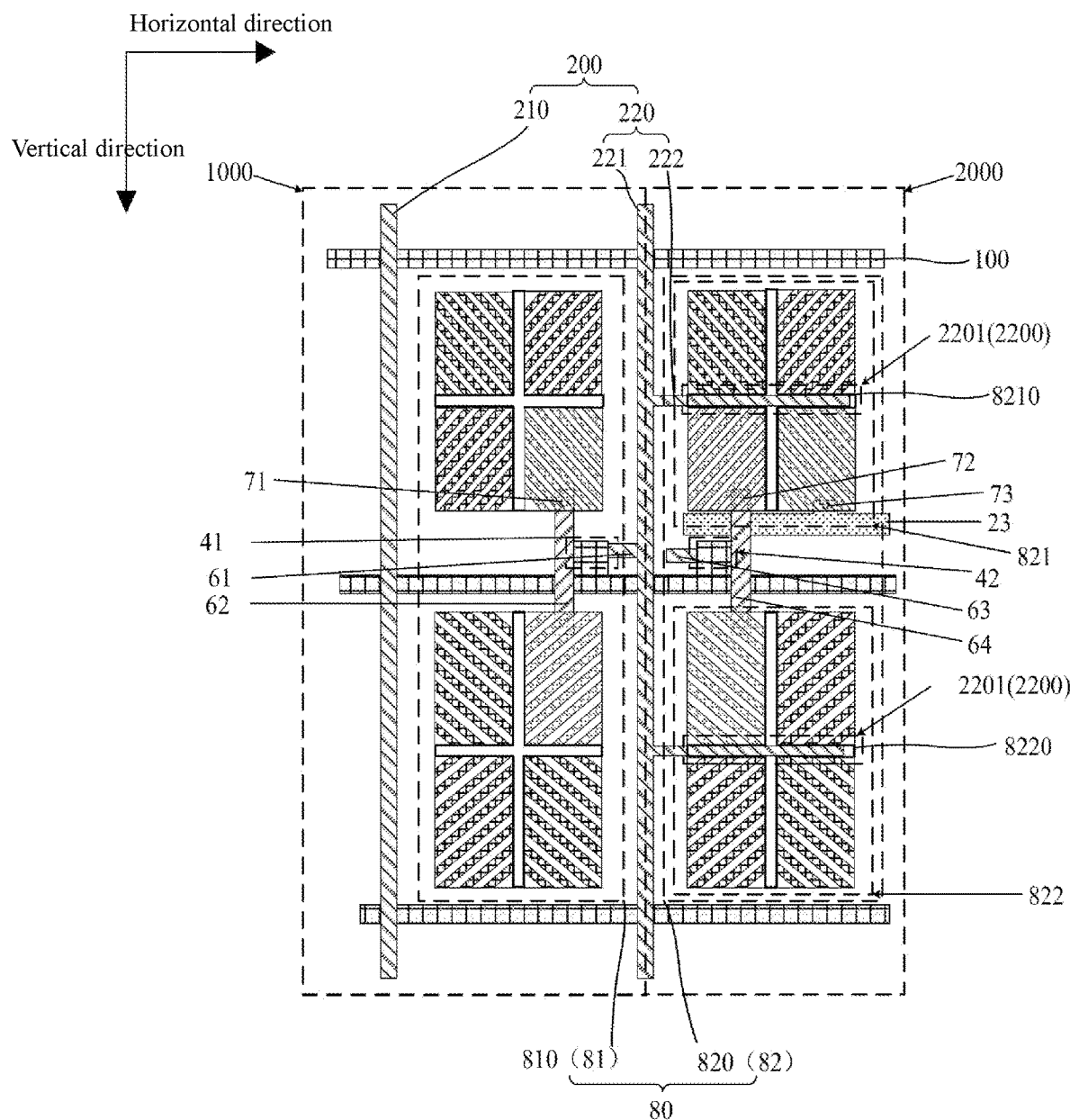
FIG. 4 is a top view of a first type of pixel units of the array substrate provided by an embodiment of the present application.

Please further refer to FIG. 4, which is a top view of a first type of pixel units of the array substrate provided by an embodiment of the present application.

In this embodiment, the array substrate includes a plurality of scan lines 100 extending along a horizontal direction and a plurality of data lines 200 extending along a vertical direction. The plurality of pixel units 80 are defined by intersections of the scan lines 100 and the data lines 200.

The display pixel electrode 810 is connected to each of the data lines 200 through the first source 61. The dummy pixel electrode 820 is disconnected from each of the data lines 200.

In this embodiment, each of the data lines 200 includes a plurality of first data lines 210 and at least one second data line 220. The second data line 220 is positioned between one of the display pixel units 81 and one of the dummy pixel units 82. This embodiment does not specifically limit a number of the second data line 220.

In this embodiment, the second data line 220 includes a trunk portion 221 and a branch portion 222. The trunk portion 221 extends along the vertical direction. The trunk portion 221 is positioned between one of the display pixel units 81 and one of the dummy pixel units 82. The trunk portion 221 is connected to the display pixel electrode 810 through the first source 61. The trunk portion 221 is disconnected from the dummy pixel electrode 820. The branch portion 222 extends along the horizontal direction. The branch portion 222 is disposed in parallel with the scan lines 100. A projection of the branch portion 222 overlaps adjacent dummy pixel electrode 820 to form an overlapping region 2200.

Specifically, in this embodiment, each of the dummy pixel units 82 includes a major region 821 and a minor region 822. The dummy pixel electrode 820 is disposed corresponding to the major region 821 and the minor region 822. The dummy pixel electrode 820 includes a main trunk electrode, the main trunk electrode includes a first trunk electrode 8210 corresponding to the major region 821 and a second trunk electrode 8220 corresponding to the minor region 822.

The projection of the branch portion 222 overlaps the first trunk electrode 8210 of adjacent dummy pixel electrode 820 to form a first overlapping region 2201. The projection of the branch portion 222 overlaps the second trunk electrode 8220 of adjacent dummy pixel electrode 820 to form a first overlapping region 2201.

This embodiment changes a configuration of the second data line 220 of the data lines 200 positioned between one of the display pixel units 81 and one of the dummy pixel units 82, so the second data line 220 includes the trunk portion 221 and the branch portion 222. The branch portion 222 extends along the horizontal direction. The projection of the branch portion 222 overlaps the first trunk electrode 8210 of the adjacent dummy pixel electrode 820 to form the first overlapping region 2201. The projection of the branch portion 222 overlaps the second trunk electrode 8220 of the adjacent dummy pixel electrode 820 to form the first overlapping region 2201. In this way, capacitances are formed between the branch portion 222 of the second data line 220 and other film layers of the dummy pixel units 82, and a capacitive load on the second data line 220 is then increased, so a charging rate of the display pixel units 81 corresponding to the trunk portion 221 of the second data line 220 is reduced. Therefore, the charging rate of each of the display pixel units 81 in the array substrate can be guaranteed to be equal, and poor display effects at the edges of the display panel having the array substrate can be relieved.

Each of the dummy pixel units 82 includes a major region 821 and a minor region 822. The dummy pixel electrode 820 is disposed corresponding to the major region 821 and the minor region 822. The dummy pixel electrode 820 includes a first trunk electrode 8210 corresponding to the major region 821 and a second trunk electrode 8220 corresponding to the minor region 822. It can be understood that the above is only used as an example, and that this embodiment does not limit this.

It should be explained that this embodiment does not specifically limit a projected area of the branch portion 222, a projected area of the first trunk electrode 8210, or a projected area of the second trunk electrode 8220.

Figure 5:
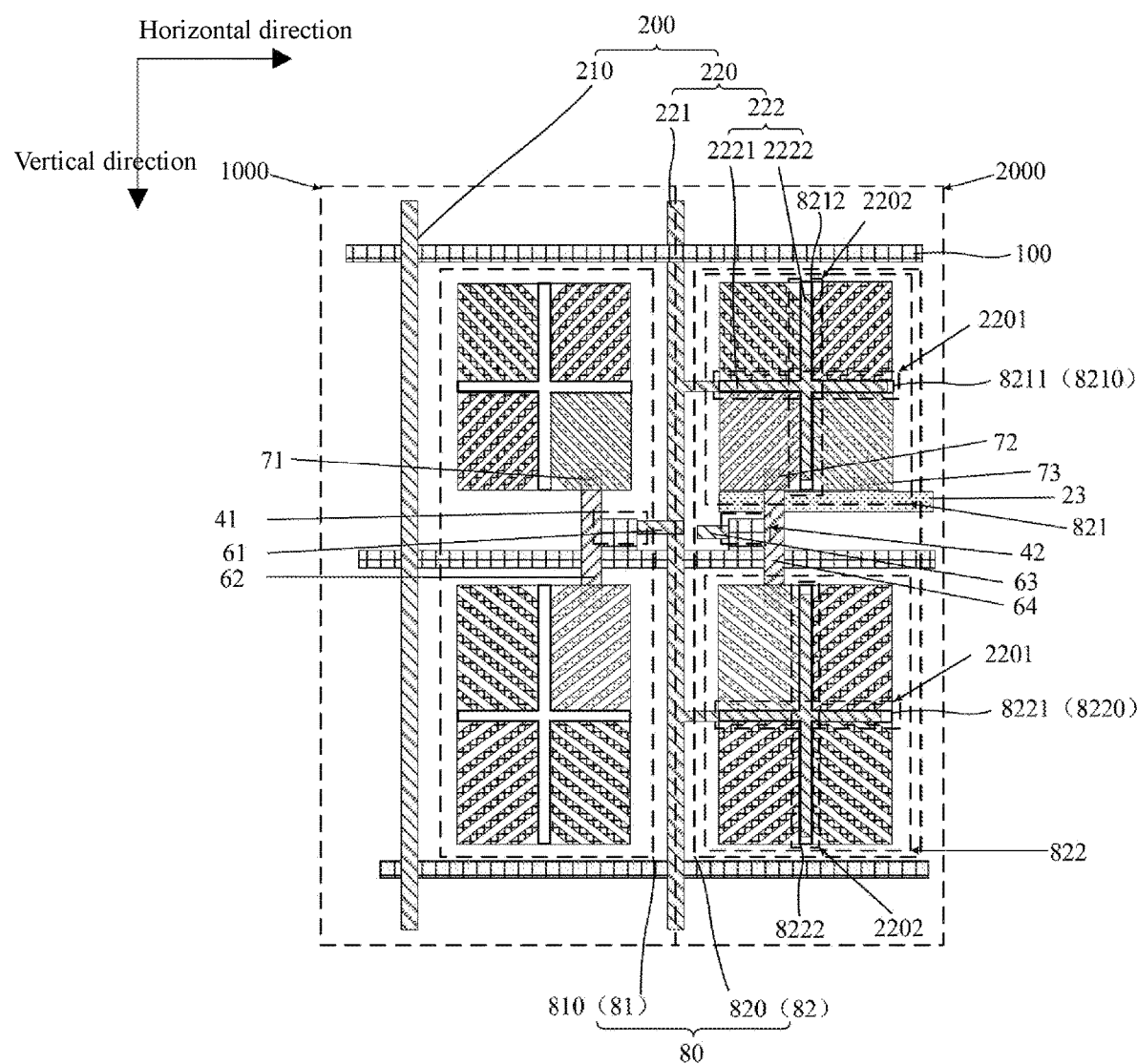
FIG. 5 is a top view of a second type of pixel units of the array substrate provided by an embodiment of the present application.

Please further refer to FIG. 5, which is a top view of a second type of pixel units of the array substrate provided by an embodiment of the present application.

In this embodiment, the second data line 220 includes a trunk portion 221 and a branch portion 222. The trunk portion 221 extends along the vertical direction. The trunk portion 221 is positioned between one of the display pixel units 81 and one of the dummy pixel units 82. The trunk portion 221 is connected to the display pixel electrode 810 through the first source 61. The trunk portion 221 is disconnected from the dummy pixel electrode 820. The branch portion 222 includes at least one first branch portion 2221 extending along the horizontal direction and at least one second branch portion 2222 extending along the vertical direction. The first branch portion 2221 perpendicularly intersects the second branch portion 2222. The first branch portion 2221 and the second branch portion 2222 are cross-shaped. A projection of the branch portion 222 overlaps adjacent dummy pixel electrode 820 to form an overlapping region 2200.

Each of the dummy pixel units 82 includes a major region 821 and a minor region 822. The dummy pixel electrode 820 is disposed corresponding to the major region 821 and the minor region 822. The dummy pixel electrode 820 includes a first trunk electrode 8210 corresponding to the major region 821 and a second trunk electrode 8220 corresponding to the minor region 822.

The first trunk electrode 8210 includes a first sub-trunk electrode 8211 and a second sub-trunk electrode 8212, which are vertically disposed. The second trunk electrode 8220 includes a third sub-trunk electrode 8221 and a fourth sub-trunk electrode 8222, which are vertically disposed.

In this embodiment, the branch portion 222 includes a plurality of first branch portions 2221 extending along the horizontal direction and a plurality of second branch portions 2222 extending along the vertical direction. The first branch portion 2221 perpendicularly intersects the second branch portion 2222. The first branch portion 2221 and the second branch portion 2222 are cross-shaped.

A projection of the first branch portion 2221 overlaps a projection of the first sub-trunk electrode 8211 of adjacent dummy pixel electrode 820 to form a first overlapping region 2201. The projection of the first branch portion 2221 overlaps a projection of the third sub-trunk electrode 8221 of the adjacent dummy pixel electrode 820 to form the first overlapping region 2201. A projection of the second branch portion 2222 overlaps a projection of the second sub-trunk electrode 8212 of adjacent dummy pixel electrode 820 to form a second overlapping region 2202. The projection of the second branch portion 2222 overlaps with a projection of the fourth sub-trunk electrode 8222 of the adjacent dummy pixel electrode 820 to form the second overlapping region 2202.

This embodiment changes a configuration of the second data line 220 of the data lines 200 positioned between one of the display pixel units 81 and one of the dummy pixel units 82, so the second data line 220 includes the trunk portion 221 and the branch portion 222. The branch portion 222 includes the plurality of first branch portions 2221 extending along the horizontal direction and the plurality of second branch portions 2222 extending along the vertical direction. The first branch portion 2221 perpendicularly intersects the second branch portion 2222. The first branch portion 2221 and the second branch portion 2222 are cross-shaped. The projection of the branch portion 222 overlaps the adjacent dummy pixel electrode 820 to form the overlapping region. In this way, capacitances are formed between the branch portion 222 of the second data line 220 and other film layers of the dummy pixel units 82, and a capacitive load on the second data line 220 is then increased, so a charging rate of the display pixel units 81 corresponding to the trunk portion 221 of the second data line 220 is reduced. Therefore, the charging rate of each of the display pixel units 81 in the array substrate can be guaranteed to be equal, and poor display effects at the edges of the display panel having the array substrate can be relieved.

It should be explained that this embodiment does not specifically limit a projected area of the branch portion 222 of the second data line 220, a projected area of the first trunk electrode 8210, or a projected area of the second trunk electrode 8220.

Figure 6:
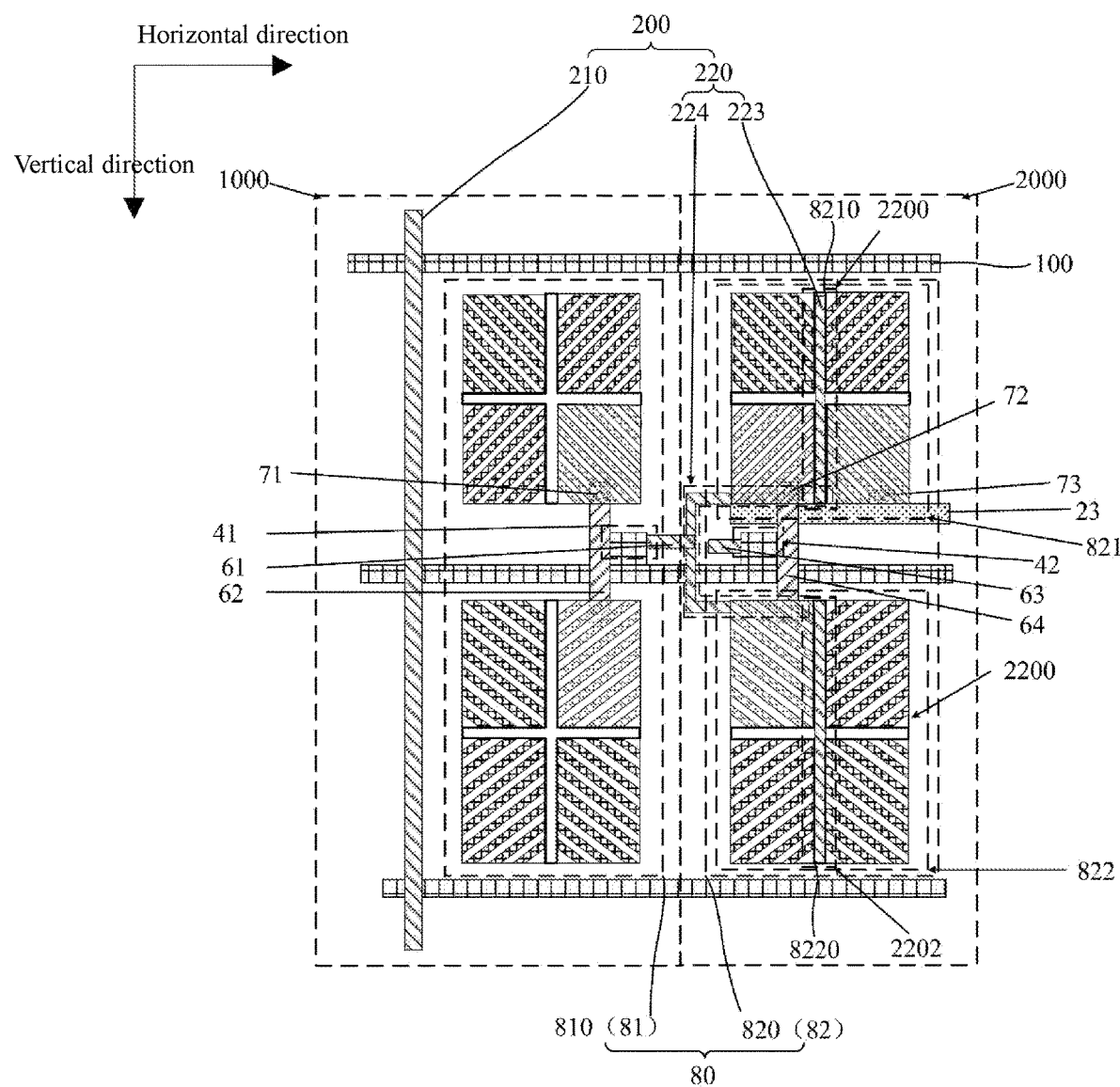
FIG. 6 is a top view of a third type of pixel units of the array substrate provided by an embodiment of the present application.

Please further refer to FIG. 6, which is a top view of a third type of pixel units of the array substrate provided by an embodiment of the present application.

In this embodiment, a length of the second data line 220 is longer than a length of each of the first data lines 210. The second data line 220 includes a first portion 223 and a second portion 224. The first portion 223 is parallel to the first data lines 210. The second portion 224 is disposed around an opening region of a corresponding one of the dummy pixel units 82. A projection of the first portion 223 overlaps the dummy pixel electrode 820 to form the overlapping region 2200.

In this embodiment, a projection of the second portion 224 of the second data line 220 partially overlaps adjacent dummy pixel electrode 820. The second portion 224 of the second data line 220 is a curve.

It should be explained that a configuration that the projection of the second portion 224 of the second data line 220 partially overlapping the adjacent dummy pixel electrode 820 is only used as an example, and that this embodiment does not specifically limit this.

Specifically, in this embodiment, each of the dummy pixel units 82 includes a major region 821 and a minor region 822. The dummy pixel electrode 820 is disposed corresponding to the major region 821 and the minor region 822. The dummy pixel electrode 820 includes a first trunk electrode 8210 corresponding to the major region 821 and a second trunk electrode 8220 corresponding to the minor region 822.

In this embodiment, a projection of the first portion 223 of the second data line 220 overlaps the first trunk electrode 8210 of the adjacent dummy pixel electrode 820 to form the overlapping region 2200. The projection of the first portion 223 of the second data line 220 overlaps the second trunk electrode 8220 of the adjacent dummy pixel electrode 820 to form the overlapping region 2200.

This embodiment changes a configuration of the second data line 220 of the data lines 200 positioned between one of the display pixel units 81 and one of the dummy pixel units 82, so the length of the second data line 220 is greater than the length of each of the first data lines 210. A resistive load on the second data line 220 is increased by increasing the length of the second data line 220. Meanwhile, the second data line 220 includes the first portion 223 and the second portion 224. The first portion 223 is parallel to the first data lines 210. The second portion 224 is disposed around the opening region of a corresponding one of the dummy pixel units 82. The projection of the first portion 223 overlaps the dummy pixel electrode 820 to form the overlapping region 2200. In this way, capacitances are formed between the first portion 223 of the second data line 220 and other film layers of the dummy pixel units 82, and a capacitive load on the second data line 220 is then increased.

This embodiment increases the resistive load and the capacitive load on the second data line 220, so a charging rate of each of the display pixel units 81 in the array substrate can be guaranteed to be equal, and poor display effects at the edges of the display panel having the array substrate can be relieved.

It should be explained that in this embodiment, the array substrate further includes a common electrode 23. The common electrode 23 is positioned in the non-display region 2000. The common electrode 23 is in a same layer as the first gate 21 and the second gate 22.

Specifically, in this embodiment the array substrate further includes a third through-hole 73 on the passivation layer 70. The third through-hole 73 penetrates the passivation layer 70, the planarization layer 50, and the gate insulating layer 30. The third through-hole 73 is positioned directly above the common electrode 23. The dummy pixel electrode 820 is electrically connected to the common electrode 23 through the third through-hole 73. In actual operation, because the projection of the second data line 220 at least overlaps a portion of the adjacent dummy pixel electrode 820 to form the overlapping region 2200, a capacitive coupling effect may occur between the second data line 220 and the dummy pixel electrode 820. The dummy pixel electrode 820 and the common electrode 23 maintain a same electric potential by electrically connecting the dummy pixel electrode 820 and the common electrode 23. As a result, the electric potential of the dummy pixel electrode 820 does not change with a voltage change, thereby relieving the capacitive coupling effect between the second data line 220 and the dummy pixel electrode 820 and enhancing a display effect.

It can be understood that a configuration that the common electrode 23 being positioned in the non-display region 2000 is only used as an example, and that this embodiment does not specifically limit this.

Second Embodiment

This embodiment further provides a display panel including the array substrate as described in any one of the above embodiments.

The array substrate has been described in detail in the above embodiments, which is not described herein again.

In summary, the present application provides the array substrate and the display panel. The display panel includes the display region and the non-display region adjacent to the display region. The array substrate includes the plurality of scan lines extending along the horizontal direction, the plurality of data lines extending along the vertical direction, and the plurality of pixel units. The pixel units include the display pixel units and the dummy pixel units. Each of the data lines includes the plurality of first data lines and at least one second data line. The second data line is positioned between one of the display pixel units and one of the dummy pixel units. The projection of the second data line at least overlaps the portion of one of the dummy pixel electrodes to form the overlapping region. The present application changes a configuration of the data line positioned between one of the display pixel units and one of the dummy pixel units. in this way, the charging rate of the display pixel units corresponding to the data lines is reduced to ensure that the charging rate is equal to a charging rate of other pixel units, thereby relieving poor display effects at edges of the display panel.

It can be understood that those having ordinary skills of the art may easily contemplate various changes and modifications of the technical solution and technical ideas of the present application and all these changes and modifications are considered within the protection scope of right for the present application.

What is claimed is:
1. An array substrate, comprising:
a display region;

a non-display region adjacent to the display region;
a plurality of scan lines extending along a horizontal direction;
a plurality of data lines extending along a vertical direction; and
a plurality of pixel units defined by intersections of the scan lines and the data lines;
wherein the pixel units comprise display pixel units positioned in the display region and dummy pixel units positioned in the non-display region, the display pixel units comprise display pixel electrodes connected to the data lines, and the dummy pixel units comprise dummy pixel electrodes disconnected from the data lines, wherein each of the dummy pixel electrodes comprises a main trunk electrode;
wherein the data lines comprise a plurality of first data lines and at least one second data line, each first data line is positioned between two adjacent ones of the display pixel units, and the second data line is positioned between one of the display pixel units and one of the dummy pixel units;
wherein the second data line comprises a trunk portion and a branch portion, the trunk portion extends along the vertical direction, the branch portion extends directly from the second data line, and an orthographic projection of the branch portion on the non-display region overlaps the main trunk electrode of an adjacent one of the dummy pixel electrodes to form a first overlapping region;
wherein the second data line comprises a first portion and a second portion, the first portion is parallel to the first data lines, the second portion surrounds an opening region of a corresponding one of the dummy pixel units, and an orthographic projection of the first portion on the non-display region overlaps the main trunk electrode of one of the dummy pixel electrodes to form a second overlapping region;
the branch portion causes an increased length of the second data line than a length of each first data line; the increased length causes a greater resistive load on the second data line than each first data line, and the first and second overlapping regions cause a greater capacitive load on the second data line than each first data line; the greater resistive load and the greater capacitive load on the second data line relative to each first data line collectively control charging rates between the dummy pixel units and the display pixel units.

2. The array substrate according to claim 1, wherein the branch portion comprises at least one first branch portion extending along the horizontal direction and at least one second branch portion extending along the vertical direction, and the first branch portion perpendicularly intersects the second branch portion; and
a projection of the first branch portion overlaps an adjacent one of the dummy pixel electrodes to form a first overlapping region, and a projection of the second branch portion overlaps an adjacent one of the dummy pixel electrodes to form a second overlapping region.

3. The array substrate according to claim 1, wherein a projection of the second portion of the second data line partially overlaps an adjacent one of the dummy pixel electrodes.

4. The array substrate according to claim 3, wherein the second portion of the second data line is a curve.

5. The array substrate according to claim 1, further comprising a common electrode, wherein the dummy pixel electrodes are electrically connected to the common electrode.

6. The array substrate according to claim 5, wherein the dummy pixel electrodes and the common electrode have a same electric potential.

7. The array substrate according to claim 6, wherein the common electrode is positioned in the non-display region.

8. A display panel comprising an array substrate;
wherein the array substrate comprises:
a display region;
a non-display region adjacent to the display region;
a plurality of scan lines extending along a horizontal direction;
a plurality of data lines extending along a vertical direction; and
a plurality of pixel units defined by intersections of the scan lines and the data lines;
wherein the pixel units comprise display pixel units positioned in the display region and dummy pixel units positioned in the non-display region, the display pixel units comprise display pixel electrodes connected to the data lines, and the dummy pixel units comprise dummy pixel electrodes disconnected from the data lines, wherein each of the dummy pixel electrodes comprises a main trunk electrode;
wherein the data lines comprise a plurality of first data lines and at least one second data line, each first data line is positioned between two adjacent ones of the display pixel units, and the second data line is positioned between one of the display pixel units and one of the dummy pixel units;
wherein the second data line comprises a trunk portion and a branch portion, the trunk portion extends along the vertical direction, the branch portion extends directly from the second data line, and an orthographic projection of the branch portion on the non-display region overlaps the main trunk electrode of an adjacent one of the dummy pixel electrodes to form a first overlapping region;
wherein the second data line comprises a first portion and a second portion, the first portion is parallel to the first data lines, the second portion surrounds an opening region of a corresponding one of the dummy pixel units, and an orthographic projection of the first portion on the non-display region overlaps the main trunk electrode of one of the dummy pixel electrodes to form a second overlapping region;
the branch portion causes an increased length of the second data line than a length of each first data line; the increased length causes a greater resistive load on the second data line than each first data line, and the first and second overlapping regions cause a greater capacitive load on the second data line than each first data line; the greater resistive load and the greater capacitive load on the second data line relative to each first data line collectively control charging rates between the dummy pixel units and the display pixel units.

9. The display panel according to claim 8, wherein the branch portion comprises at least one first branch portion extending along the horizontal direction and at least one second branch portion extending along the vertical direction, and the first branch portion perpendicularly intersects the second branch portion; and
a projection of the first branch portion overlaps an adjacent one of the dummy pixel electrodes to form a first overlapping region, and a projection of the second branch portion overlaps an adjacent one of the dummy pixel electrodes to form a second overlapping region.

10. The display panel according to claim 8, wherein a projection of the second portion of the second data line partially overlaps an adjacent one of the dummy pixel electrodes.

11. The display panel according to claim 10, wherein the second portion of the second data line is a curve.

12. The display panel according to claim 8, wherein the array substrate further comprises a common electrode, and the dummy pixel electrodes are electrically connected to the common electrode.

13. The display panel according to claim 12, wherein the dummy pixel electrodes and the common electrode have a same electric potential.

14. The display panel according to claim 13, wherein the common electrode is positioned in the non-display region.

* * * * *